US012732569B2

(12) United States Patent
Prieditis

(10) Patent No.: US 12,732,569 B2
(45) **Date of Patent: *Sep. 8, 2026**

(54) SYSTEM AND METHOD FOR FACILITATING ROUTING

(71) Applicant: Vercara, LLC, Sterling, VA (US)

(72) Inventor: Armand Prieditis, Arcata, CA (US)

(73) Assignee: DigiCert, Inc., Lehi, UT (US)

( * ) Notice: Subject to any disclaimer, the term of this patent is extended or adjusted under 35 U.S.C. 154(b) by 114 days.

This patent is subject to a terminal disclaimer.

(21) Appl. No.: 18/781,262

(22) Filed: Jul. 23, 2024

(65) Prior Publication Data

US 2024/0380826 A1 Nov. 14, 2024

Related U.S. Application Data

(63) Continuation of application No. 18/148,905, filed on Dec. 30, 2022, now Pat. No. 12,052,327, which is a continuation of application No. 17/248,423, filed on Jan. 25, 2021, now Pat. No. 11,546,446, which is a continuation of application No. 16/293,495, filed on Mar. 5, 2019, now Pat. No. 10,904,352, which is a continuation of application No. 15/463,107, filed on Mar. 20, 2017, now Pat. No. 10,244,072, which is a continuation of application No. 14/534,443, filed on Nov. 6, 2014, now Pat. No. 9,602,616.

(60) Provisional application No. 61/900,739, filed on Nov. 6, 2013.

(51) Int. Cl.

| | |
|---|---|
| ***H04L 12/721*** | (2013.01) |
| ***H04L 29/08*** | (2006.01) |
| ***H04L 67/568*** | (2022.01) |
| ***H04L 67/63*** | (2022.01) |
| *H04L 61/30* | (2022.01) |

(52) U.S. Cl.

CPC ............ *H04L 67/568* (2022.05); *H04L 67/63* (2022.05); *H04L 61/30* (2013.01)

(58) Field of Classification Search

CPC ....... H04L 67/568; H04L 67/63; H04L 61/30; H04L 12/66

USPC .......................................................... 709/242

See application file for complete search history.

(56) References Cited

U.S. PATENT DOCUMENTS

| | | | |
|---|---|---|---|
| 5,884,249 | A | 3/1999 | Namba et al. |
| 6,041,053 | A | 3/2000 | Douceur et al. |
| 6,308,202 | B1 | 10/2001 | Cohn et al. |
| 6,542,922 | B1 | 4/2003 | Chessell et al. |
| 7,127,415 | B1 | 10/2006 | Verchere |
| 7,564,840 | B2 | 7/2009 | Elliott et al. |
| 7,672,862 | B1 | 3/2010 | Venkatasubramanyan et al. |
| 7,987,265 | B2 | 7/2011 | Fukuzawa |
| 8,046,449 | B2 | 10/2011 | Yoshiuchi |

(Continued)

*Primary Examiner* — Jude Jean Gilles

(74) *Attorney, Agent, or Firm* — Baratta Law PLLC; Lawrence A. Baratta, Jr.

(57) ABSTRACT

A system and method are provided for routing content requests. On a given server network, content requests comprising a character string may be routed up a hierarchical network topology until a linear chain, corresponding to the character string, is identified. Thus, the content request is forwarded up the hierarchy until an intersecting server network is reached. Then the content request is forwarded down the hierarchy until, along a published linear chain corresponding to the character string, until a content source is reached. Content is provided to the requestor along a reverse path of the content request.

20 Claims, 4 Drawing Sheets

(56) References Cited

U.S. PATENT DOCUMENTS

| | | | |
|---|---|---|---|
| 8,509,814 | B1 | 8/2013 | Parker |
| 8,861,377 | B2 | 10/2014 | Okuyama et al. |
| 9,041,729 | B1 | 5/2015 | Stahl et al. |
| 9,128,784 | B2 | 9/2015 | Glasgow et al. |
| 9,143,575 | B2 | 9/2015 | Cao et al. |
| 9,407,720 | B2 | 8/2016 | Gomilko et al. |
| 9,602,613 | B2 * | 3/2017 | Zahavi .................... H04L 67/34 |
| 9,602,616 | B2 | 3/2017 | Prieditis |
| 10,244,072 | B2 * | 3/2019 | Prieditis ................ H04L 67/568 |
| 10,904,352 | B2 * | 1/2021 | Prieditis .................. H04L 67/63 |
| 11,546,446 | B2 * | 1/2023 | Prieditis ................ H04L 67/568 |
| 12,052,327 | B2 * | 7/2024 | Prieditis ................ H04L 67/568 |
| 2002/0009987 | A1 | 1/2002 | Tobita |
| 2002/0103786 | A1 | 8/2002 | Goel |
| 2002/0103787 | A1 | 8/2002 | Goel et al. |
| 2002/0103788 | A1 | 8/2002 | Donaldson et al. |
| 2002/0103797 | A1 | 8/2002 | Goel et al. |
| 2005/0245241 | A1 | 11/2005 | Durand et al. |
| 2005/0259658 | A1 | 11/2005 | Logan et al. |
| 2006/0020933 | A1 | 1/2006 | Pasumansky et al. |
| 2008/0027947 | A1 | 1/2008 | Pritchett et al. |
| 2008/0104687 | A1 | 5/2008 | Fujiwara et al. |
| 2008/0221960 | A1 | 9/2008 | Moorkanat et al. |
| 2009/0132813 | A1 | 5/2009 | Schibuk |
| 2010/0106621 | A1 | 4/2010 | Verchere |
| 2010/0146471 | A1 | 6/2010 | Wetter et al. |
| 2010/0217990 | A1 | 8/2010 | Abe |
| 2011/0235509 | A1 | 9/2011 | Szymanski |
| 2012/0036130 | A1 | 2/2012 | Light et al. |
| 2012/0054192 | A1 | 3/2012 | Song et al. |
| 2012/0303764 | A1 | 11/2012 | Ibenforth et al. |
| 2013/0041963 | A1 | 2/2013 | Cho et al. |
| 2013/0132548 | A1 | 5/2013 | Cabos |
| 2014/0173110 | A1 | 6/2014 | Uetabira |
| 2015/0100466 | A1 | 4/2015 | Deguchi |
| 2015/0127852 | A1 | 5/2015 | Prieditis |
| 2017/0289296 | A1 | 10/2017 | Prieditis |
| 2020/0036807 | A1 | 1/2020 | Prieditis |
| 2023/0344916 | A1 | 10/2023 | Prieditis |

* cited by examiner

SYSTEM AND METHOD FOR FACILITATING ROUTING

RELATED APPLICATIONS

This application is a Continuation of U.S. patent application Ser. No. 18/148,905, filed Dec. 30, 2022, which will issue as U.S. Pat. No. 12,052,327 on Jul. 30, 2024, which is a Continuation of U.S. patent application Ser. No. 17/248,423, filed Jan. 25, 2021, now U.S. Pat. No. 11,546,446, issued Jan. 3, 2023, which is a Continuation of U.S. patent application Ser. No. 16/293,495, filed Mar. 5, 2019, now U.S. Pat. No. 10,904,352, issued Jan. 26, 2021; which is a Continuation of U.S. patent application Ser. No. 15/463,107, filed Mar. 20, 2017, now U.S. Pat. No. 10,244,072, issued Mar. 26, 2019; which is a Continuation of U.S. patent application Ser. No. 14/534,443, filed Nov. 6, 2014, now U.S. Pat. No. 9,602,616, issued Mar. 21, 2017; which claims benefit of priority to U.S. Provisional Patent Application No. 61/900,739, filed Nov. 6, 2013. All of the aforementioned priority applications being hereby incorporated by reference in their entirety for all purposes.

TECHNICAL FIELD

Examples described herein relate to a system and method for facilitating routing using a linearly published character string.

BACKGROUND

The increase on the number of top-level domains is soon to cause overloading in top-level routers. Domain Name System (DNS) is currently used to resolve a domain name to its corresponding IP address. DNS resolution typically involves a top-level domain name server in communication with several lower-level servers, all of which require domain name registration and then spreading of the domain name (or parts thereof) to the lower-level servers.

Moreover, the Internet Protocol (IP) address to which a domain name resolves, may not be one that ensures the fastest delivery of the requested content. For example, the IP address may not be associated with a server within an optimal proximity to the requestor. Increasing the number of content sources can speed up content delivery. However, DNS does not easily support delivery from multiple sources. Furthermore, many domains do not include geo-locational hints to enable the current DNS system to deduce a region in which the requested content is located. Accordingly, while the existing Internet architecture, and current DNS-based distribution, may be efficient for communication, issues surrounding mass content distribution are becoming increasingly apparent.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1A:
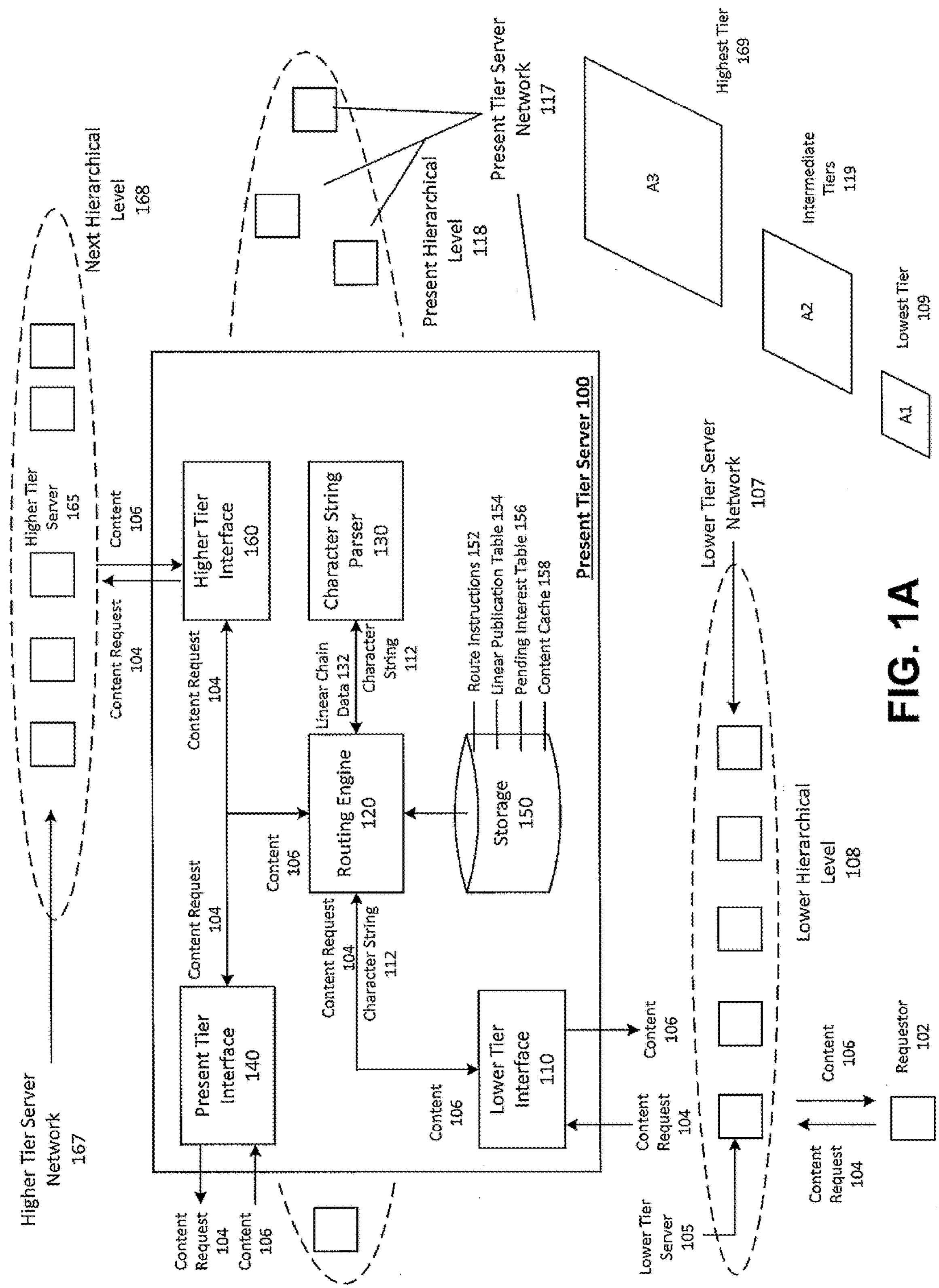
FIG. 1A illustrates an example regional server of a multi-tiered, region-based, hierarchical network, implementing a routing process as disclosed herein.

Examples described herein include systems and methods for routing content requests in accordance with a linearly published character string. Example methods described herein may be implemented by a regional server included in a present server network comprised with a plurality of additional server network of the same present hierarchical level of a region-based hierarchical network. Each present server network of the present hierarchical level can represent a specified geographic region, where each geographic region of the present hierarchical level may represent a similar sized geographic region, or a similar number of users (e.g., for dense populations). Such a region-based hierarchical network represents a network architecture based on regional tiers, in which content requests are transmitted from a narrow local level, "up" the regional network hierarchy, until a linear chain is identified in which a direct flow "down" the regional hierarchy may be implemented to a content source to satisfy the content request. Content is then optimally directed through the regional network hierarchy efficiently, bypassing many of the inefficiencies of the current DNS system.

Examples described herein recognize that previous approaches to delivering content quickly include Content Centric Networking (CCN), in which a content request is made by name, and routers use the name to route the request towards data sources. The content request is based on a longest name prefix match. For example, CCN names can be hierarchical, such as "contentabc/sectiond/articlef/012345.html." However, unlike standard DNS, the content is returned by following the reverse path back to the content requestor. To implement such routing, a CCN router maintains three data structures:

- A Pending Interest Table (PIT), which holds requests for which the router has not yet received a response;
- A Forwarding Interest Base (FIB), which maps name prefixes to one or multiple physical network interfaces, specifying the next router to which the request can be forwarded; and
- A Content Store (CS), which can cache content from previous requests, thus enabling faster retrieval of frequently requested content.

In CCN, when a CCN router receives a request, it first checks to see if there is a match in its CS. If there is a match, the content cached in the CS is sent back to the requestor. If there is not a match, the CCN router logs the request in its PIT and forwards the request to a next router by using the FIB. When content is received, the CCN router matches the content against the PIT, and then sends the content to the requestor listed in the PIT.

Thus, CCN provides a faster method of satisfying content requests by alleviating some of the above-described inefficiencies of DNS content distribution. CCN also recognizes that content can be stored in multiple locations on the Internet, and can identify a closest source to further improve speed of delivery. However, CCN suffers from several shortcomings, including scalability, since every CCN router must maintain either a unique or aggregated entry for every requested content item, which may overload the CCN router with the dramatic increases in content requests currently experienced, and to be experienced in the future. Furthermore, CCN suffers from a reachability problem, in which a content request may be discarded, if no match is found, even though the requested content is located somewhere on the Internet. Further still, a critical aspect of CCN is the hierarchical naming scheme for content. However, this naming scheme bears no relation to the network topology.

Examples described herein improve upon current DNS and CCN content distribution methods by utilizing a name-based routing system that can leverage a hierarchically structured regionally based network. As such, example methods are provided in which a content request may be received by a regional server from an end user. The content request can include a character string identifying content to be accessed by the end user. Based on the character string, the regional server can determine whether the content is accessible from a respective one of a number of servers in a present server network of a present hierarchical level of the region-based hierarchical network—which itself includes multiple regional tiers, or hierarchical levels. In response to determining that the content is accessible from the present server network, the regional server can forward the content request to the respective server in the present server network, which can pull the content directly from a source and send the content to the regional server. Upon receiving the content, the regional server can forward the content to the end user.

Examples described herein utilize linear naming schemes, in which content names, corresponding to the content requests, are published "up" through the region-based hierarchical network, forming a logical linear chain intersecting each hierarchical level at a single point or node, which may correspond to a single server of a present server network of a particular hierarchical level. Thus, in accordance with one or more examples, based on determining that the content is not accessible within its region, the regional server described herein may forward the content request to a next hierarchical level of the region-based hierarchical network, where the next hierarchical level includes a number of higher-tiered servers representing a greater geographic region in relation to the present geographic region. Thus, the content request flows "up" the region-based hierarchical network until an intersecting server network is found, corresponding to a largest region in the hierarchical network, that has a direct linear link through the hierarchical network, to a content source that can satisfy the content request. The requested content may then be retrieved linearly from the source, and then sent linearly back "down" the hierarchy directly to the requestor.

One or more examples described herein can utilize the advantages provided by CCN, in which respective regional servers may include a PIT to log content requests until the content corresponding to the request is transmitted through the regional server. Furthermore, respective regional servers, as described herein, may include a FIB to identify a next server, within or outside the present hierarchical level, in which to transmit content and/or content requests. Respective regional servers, as described herein, may further include a CS to cache received content, so that an initial check may be made to determine whether the requested content is stored in the regional server's cache in order to provide the content directly to the requestor without the need to continue up the hierarchy.

Additionally or alternatively, examples as described herein may further alleviate problems surrounding multiple or numerous requests, such as those relating to Distributed Denial of Service (DDoS) attacks, by isolating such requests at a lowest hierarchical level. Specifically, a regional server at a lowest hierarchical level may receive any number of requests, such as Distributed DDoS requests, for targeted content and then pool all of the requests into a single content request for the targeted content. Thus, the regional server may only forward the single content request to the next hierarchical level of the region-based hierarchical network.

In addition, one or more examples described herein may utilize the linear naming scheme to update or modify content and/or data by name over the region-based hierarchical network. For example, a content request may take the form of commands to update a database (e.g., changing the IP address associated with a name on one or more selected servers). In such examples, once the content or data is updated, an acknowledgment may be transmitted through the hierarchy back to the requestor.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

As used herein, a "request" is a name or an identifier for a name or a query for a response or update in some language (e.g., SQL).

As used herein, a "regional server" is any server within the region-based hierarchical network, which includes lowest tiered servers that are directly connected to content requestors, middle tiered servers that send content and content requests "up" and "down" hierarchical levels of the hierarchical network, and highest tiered servers representing the greatest region to discover an intersecting linear chain (e.g., national regional level, or world regional level).

A "tier" or "hierarchical level" may be used interchangeably, and may be represented by server networks associated with similar sized regions or similarly densely populated regions. Thus, a highest or higher-tiered server may be included in a next or greatest hierarchical level of the hierarchical network-which, in turn, is included in a higher-tiered server network representing a greater geographical region. Further, a lower or lowest tiered server may be included in a lower-tiered server network of a lower or lowest hierarchical level representing a smaller geographical region.

As used herein, "region-based hierarchical network" or "hierarchical network" may be defined as a fractal-like network topology in which smallest local regions, each comprising a number of local-regional servers, are contained within intermediate local regions, each comprising a number of intermediate-regional servers. Each intermediate local region, can be contain within a larger region, which comprises a number of higher-level regional servers, and so on until a highest region is reached, which can comprise a number of highest-level regional servers and correspond to a largest physical area in which all, or nearly all linear chains intersect (e.g., on a national or worldwide scale).

As used herein a "linear chain" corresponds to a name publishing scheme in which names, corresponding to content locations and content requests, are published linearly "up" through the region-based hierarchical network, intersecting a single regional node, or server system, on each hierarchical level of the hierarchical network. Thus, content is sent "up" through the hierarchy to an intersecting hierarchical level, and then "down" through the hierarchy to the content requestor. Likewise, content requests are sent "up" through the hierarchy to an intersecting server network of a particular hierarchical level (i.e., a node intersecting with the linear chain), and then "down" through the hierarchy to the content source.

As used herein, a "node" may refer to a specified server network of a particular hierarchical level of the region-based hierarchical network. Thus, in accordance with many examples discussed herein, any number of server networks, corresponding to a particular geographic region, may be included on the particular hierarchical level. Such may be the case for each hierarchical level of the region-based hierarchical network. Accordingly, a "node" may refer to a single region in which the server network represents, which grow larger and larger as one moves up the hierarchical levels. Within a single server network of a particular hierarchical level, a number of regional servers may represent the specified geographic region. As scale is increased, the appearance of the hierarchical network may remain the same (or similarly) due to is fractal nature.

Among other benefits, examples described herein achieve a technical effect in which requested Internet content is provided more quickly than in existing architectures. Furthermore, examples described herein achieve a technical effect of isolating DoS or DDoS attacks at a lowest hierarchical level of the network infrastructure, thus alleviating such threats to the larger network infrastructure.

One or more variations described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component can exist in a hardware component independently of other modules/components or a module/component can be a shared element or process of other modules/components, programs or machines. A module or component may reside on one machine, such as on a client or on a server, or may alternatively be distributed among multiple machines, such as on multiple clients or server machines. Any system described may be implemented in whole or in part on a server, or as part of a network service. Alternatively, a system such as described herein may be implemented on a local computer or terminal, in whole or in part. In either case, implementation of a system may use memory, processors and network resources (including data ports and signal lines (optical, electrical etc.), unless stated otherwise.

Furthermore, one or more variations described herein may be implemented through the use of instructions that are executable by one or more processors. These instructions may be carried on a non-transitory computer-readable medium. Machines shown in figures below provide examples of processing resources and non-transitory computer-readable mediums on which instructions for implementing one or more variations can be executed and/or carried. For example, a machine shown for one or more examples includes processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, and network-enabled devices (e.g. portable devices such as cell phones) are all examples of machines and devices that use processors, memory, and instructions stored on computer-readable mediums.

System Overview

FIG. 1A illustrates an example regional server of a multi-tiered, region-based, hierarchical network, implementing a routing process as disclosed herein. Thus, the example regional, or present tier, server 100 may be included in a present tier server network 117 of a present hierarchical level 118 of the region-based hierarchical network. The hierarchical level of the present tier server 100 is arbitrary, and may be included in any server network representing any intermediate, lowest, or highest hierarchical level of the region-based hierarchical network. For purposes of illustration, the present tier server 100 shown in FIG. 1A is included in one of the intermediate or present hierarchical levels 118, between a lower hierarchical level 108 and a higher hierarchical level 168.

Referring to FIG. 1A, a requestor 102 may send a content request 104 over the region-based hierarchical network. The content request 104 may be transmitted up through the hierarchy through one or more lower tier servers included in the lower tier server network 107. The lower tier server network 107 may include any number of servers representing a geographic region or a specified user population. Accordingly, numerous lower tier server networks can comprise the lower hierarchical level of the region-based hierarchical network. The lower tier server network 107 may be in communication with a single server of the present tier server network 117. Alternatively, more than one present tier server may be allocated to the lower tier server network 107.

A lower tier server 105 may receive the content request 104 directly from the requestor 102 and determine whether one of the lower tier servers in the lower tier server network 107 has direct access to a source of the content. If so, the lower tier server 105 may horizontally transmit the request to the specified lower tier server with a direct link to the content source, and the content may be pulled and transmitted back to the requestor 102 along a reverse path in which the content request 104 was transmitted.

Alternatively, if the lower tier server 105 determines that none of the servers in the lower tier server network 107 has direct linear access to the content source, the lower tier server 105 may automatically pass the content request 104 up to a next hierarchical level, in this case the present hierarchical level 118. Thus, according to several examples, the present tier server 100 includes a lower tier interface 110 to transmit and receive communications to and from the lower tier server network 107. The content request 104 may be received by the lower tier interface 110 which can transmit the content request to a routing engine 120 of the present tier server 100.

As provided herein, the content request 104 may be in the form of a name comprised of a character string 112 (arbitrary or otherwise) that represents a call to access specified content 106 located at one or more content sources on the Internet. Such names, associated with the requested content, may be published linearly up through the hierarchical network to a highest hierarchical level such that a linear chain, representing publication path of a name or character string, intersects each hierarchical level at one or more points. Thus, a content source may be located within a lowest tier 109 and include content represented by a name published linearly through any number of intermediate tiers 119 until a highest tier 169 is reached—each tier being represented by a number of server networks of a corresponding hierarchical level.

Additionally, content requests may be transmitted up through the hierarchy until an intersecting node, corresponding to a particular server network of a particular hierarchical network, is reached. Referring to FIG. 1A, the routing engine 120 may be in communication with a character string parser 130, which may parse the character string 112 included within or comprising the content request 104 to determine linear chain data 132 which can identify whether the content 106 which satisfies the content request 104 has been published through any one of the servers of the present tier server network 117. The routing engine 120 can implement routing instructions 152, stored in a storage device 150 included in the present tier server 100. Based on the linear chain data 132 and the routing instructions 152, the routing engine 120 may perform any number of operations.

Specifically, if the linear chain data 132 identifies that a content source of the content 106 is directly linked to the present tier server 100, then the linear chain corresponding to the published character string 112 the routing engine 120 intersects the present hierarchical level 118 at the present tier server 100, and the routing engine 120 may transfer the content request 104 to the lower tier interface 110 in order to submit the content request to an appropriate lower tier server network of the linear chain. As such, the content 106 is then received from the appropriate lower tier server network, through the lower tier interface 110. The routing engine 120 may then transmit the content 106 back through the lower tier interface 110 to the lower tier server 105 along the reverse path in which the content request 104 was received. Accordingly, the content 106 may then be transmitted to the requestor 102.

Alternatively, if the linear chain data 132 identifies that a content source of the content 106 is directly linked to another present tier server of the present tier server network 117, then the linear chain corresponding to the published character string 112 intersects the present hierarchical level at the present tier server network 117, and the routing engine 120 may transfer the content request 104 to a present tier interface 140 of the present tier server 100. The present tier interface 140 may transmit the content request 104 to the appropriate present tier server of the present tier server network 117 that has a direct link to the source of the content 106. As such, the content 106 is received through the present tier interface 140, and the routing engine 120 may then transmit the content 106 through the lower tier interface 110 to the lower tier server 105 along the reverse path in which the content request 104 was received. Accordingly, the content 106 may then be transmitted to the requestor 102.

Alternatively still, if the linear chain data 132 identifies that a content source of the content 106 is not directly linked to any present tier server of the present tier server network 117, then the linear chain corresponding to the published character string 112 does not intersect with the present hierarchical level at the present tier server network 117. Instead, the linear chain intersects at a different present tier server network of the present hierarchical level. Thus, the routing engine 120 may transfer the content request 104 to a higher tier interface 160 of the present tier server 100. The higher tier interface 160 may then transmit the request to a next hierarchical level 168. The content request 104 may be received by a higher tier server 165 of a higher tier server network 167 included as a part of the next hierarchical level 168.

The higher tier server 165 may then perform similar functions as discussed with respect to the present tier server 100. Accordingly, the higher tier server 165 can pass the content request down through the hierarchy if the linear chain intersects with the next hierarchical level 168, or up to an even higher hierarchical level if the linear chain does not intersect with the next hierarchical level 168. Thus, the content request may pass through any number of higher tiers until a server network of a particular hierarchical level is reached that intersects with the linear chain.

Irrespective of the final path of the content request 104, the content 106 itself is received through the higher tier interface 160, and the routing engine 120 may then transmit the content 106 through the lower tier interface 110 to the lower tier server 105 along the reverse path in which the content request 104 was received. Accordingly, the content 106 may then be transmitted to the requestor 102.

The manner in which such operations of the routing engine 120 are performed can vary, and can utilize the advantages provided by CCN, in which the present tier server 100 may include a Pending Interest Table (PIT) 156, included in the storage device 150, to log the content request 104 until the content 106 corresponding to the request 104 is received. The routing engine 120 may then amend the PIT 156 to indicate that the content request 104 has been satisfied.

Furthermore, the present tier server 100 may include a linear publication table 154, similar to the Forwarding Interest Base (FIB) of a CCN router. In accordance with one or more examples, the routing engine 120 may map the linear chain data 132 to the linear publication table 154 to identify whether the linear chain of the character string 112 intersects the present hierarchical level 118 at the present tier server network 117. Additionally or alternatively, the routing engine 120 may determine where the linear chain will intersect with a current path of the content request 104. Accordingly, the linear publication table 154 may provide the routing engine 120 with information regarding a next server, within or outside the present hierarchical level, in which to transmit the content request 104.

Further still, the present tier server 100 may further include a content cache 158 to cache the received content 106. Thus, upon receiving a subsequent content request for the same content 106, the routing engine may perform an initial check to determine whether the requested content 106 is stored in the content cache 158 of the present tier server 100. If so, the routing engine 120 may halt the upward flow of the content request 104, and provide the content 106 directly to the requestor without the need to continue up the hierarchy.

According to one or more examples described, the routing engine 120 may execute route instructions 152 stored in the storage device 150. Based on the route instructions 152, the routing engine 120 may perform such operations as performing a look-up in the pending interest table 156 to determine whether the content request 104 may be pooled with a previously received request for the same content 106—in which case the routing engine may halt the upward flow of the content request 104 and await the content 106 satisfying the previous request. Upon receiving the content 106, the route instructions 152 may then instruct the routing engine 120 to transmit the content 106 along reverse paths to satisfy both the previous content request and the content request 104 for the same content 106.

Additionally or alternatively, the route instructions 152 may instruct the routing engine 120 to log the content request 104 in the pending interest table 156 when sending the content request 104 upwards, horizontally, or downwards through the hierarchical network. Accordingly, upon receiving the content 106 the route instructions 152 can instruct the routing engine 120 to amend the pending interest table 154 to either deleted the content request 104, indicate that the content request 104 has been satisfied, or indicate that the content 106 has been temporarily cached in the content cache 158.

According to examples, the route instructions 120 may further instruct the routing engine 120 to cache the content in the content cache 158 for a predetermined time period. Accordingly, the routing engine 120 may associate each content item cached in the cache store 158 with an individual timer. Upon expiration of the predetermined time period, cached content item may be deleted or overwritten. Alternatively, the routing engine 120 may identify several content requests for similar content items, and associate such content items in the content cache 158 with a longer time period.

The route instructions 152 may further instruct the routing engine 120 to log update information in the pending interest table 156. For content requests corresponding to updating content or data in a database, the routing engine 120 transmit the content request in accordance with a mapping between the linear chain data 132 of the content request and the linear publication table 154. The pending interest table 156 may be logged with an entry indicating that the content request corresponds to an update, and the routing engine 120 can await for an acknowledgment that the update has been performed. Upon receiving such an acknowledgement, the routing engine 120 may delete or amend the update entry in the pending interest table 156 to indicate that the content request has been satisfied. The routing engine 120 may then transmit the acknowledgement along a reverse path back to the requestor.

Additionally or as an alternative, the route instructions 152 can further instruct the routing engine 120 to pool multiple content requests. Thus, if several content requests for the same content are received, the routing engine 120 can simply append such requests to the pending interest table 156 without submitting such requests further along the hierarchy. Thus, at any given time the present tier server 100 will only have a single content request transmitted up, horizontally, or down the hierarchy for any number of requests for the same content. Such an arrangement is useful in alleviating problems surrounding Denial of Service (DoS) or Distributed Denial of Service (DDoS) attacks by isolating such requests at a lowest hierarchical level possible. Specifically, the present tier server 100 may receive any number of requests, such as DDoS requests, for targeted content and then pool all of the requests into a single content request for the targeted content. Thus, the present tier server 100 will only forward the single content request to a next hierarchical level of the region-based hierarchical network.

Figure 1B:
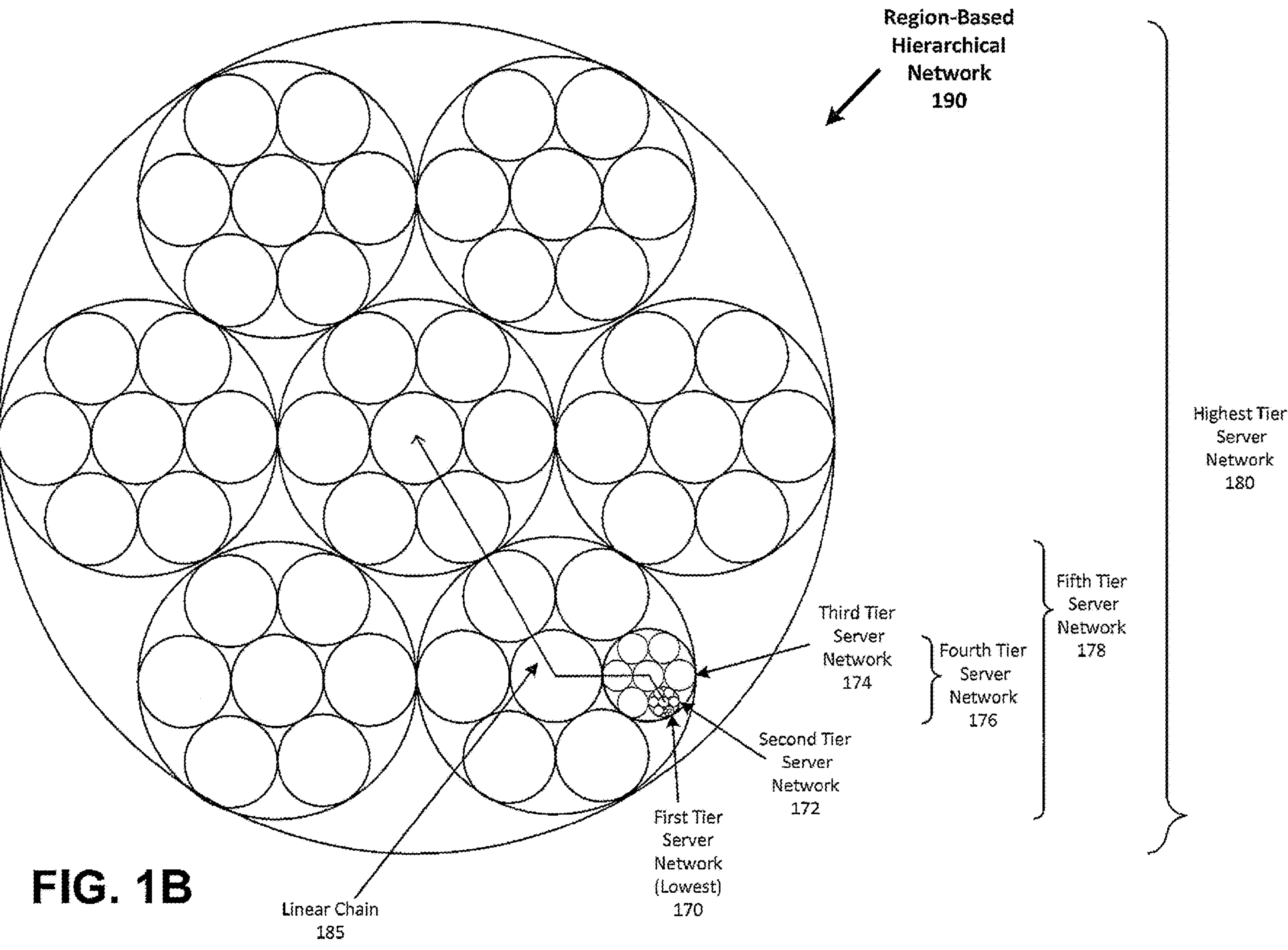
FIG. 1B illustrates the fractal nature of an example region-based hierarchical network topology.

FIG. 1B illustrates the fractal nature of an example region-based hierarchical network topology, according to several examples described. In the below discussion of FIG. 1B, reference may be made to like reference characters representing various features of FIG. 1A. For example, the present tier server 100, as discussed with respect to FIG. 1A, may be implemented on any of the described hierarchical levels as illustrated in FIG. 1B.

Referring to FIG. 1B, a region-based hierarchical network 190 may be represented fractally, or quasi-fractally, such that several lower tier server networks may be included in a single intermediate or higher tier server network. Such server networks may represent respective physical geographic regions in which higher tiered server networks represent progressively larger geographic areas. Additionally or alternatively, such server networks may represent a user population (e.g., for an area having higher population density), in which each server network of a particular hierarchical level represents the same or a similar number of users.

According to examples described herein, a lowest tier server network 170 may include a number of lowest tier servers representing a smallest geographic region or a smallest number of users. The lowest tier server network 170 may, for example, represent on the order of tens, hundreds, or thousands of users of a particular community, rural area, municipality, etc. Additionally or alternatively, such lowest tier server networks 170 may correspond to localized mesh networks and/or municipal wireless networks. However, for such mesh and/or municipal networks, any hierarchical level shown in FIG. 1B (e.g., an intermediate hierarchical level) may be correlated to the local network.

A second tier server network 172 may include any number of lowest tier server networks 170. Furthermore, any number of second tier server networks 172 may represent a second hierarchical level, and be included in a number of third tier server networks 174. Such second and third tier server networks 172, 174 may represent larger areas on the order of tens of thousands to hundreds of thousands of users. Accordingly, such second and third tier server networks 172, 174 may represent townships and small cities or a wider rural area.

A fourth tier server network 176 may include a number of third tier server networks 176. Any number of fourth tier server networks 176 may represent the fourth hierarchical level of the region-based hierarchical network 190. Such fourth tier server networks may each represent on the order of millions of users, corresponding to a county or multiple counties including several townships, municipalities, and/or cities.

A number of fourth tier server networks 176 may be included in a single fifth tier server network 178. Any number of fifth tier server networks represent a fifth hierarchical level and may be included in a sixth, or highest tier server network 180. A single fifth tier server network 178 may represent, for example, tens of millions of users, and may span several states, providences, and/or nations.

Any number of hierarchical levels may be included in the region-based hierarchical network 190, with each hierarchical level including a number of present tier server networks representing roughly the same or similar number of users and/or geographic area. For purposes of illustration, a sixth tier server network is shown as the highest tier server network 180. This highest tier server network 180 may include any number of fifth tier server networks 178. Furthermore, any number of highest tier server networks 180 may represent the highest hierarchical level of the region-based hierarchical network 190. A highest tier server network 180 may represent, for example, hundreds of millions to billions of users and may span across nations or continents.

In accordance with examples described, a linear chain 185 (as described with respect to FIG. 1A), corresponding to a published character string 112, can traverse from a lowest tier server network 170, through specified intermediate tier server networks 172-178, up to the highest tier server network 180, such that the linear chain 185 intersects each hierarchical network at a single node (e.g., present tier server 100).

According to one or more examples, the region-based hierarchical network 190 may be implemented using more powerful servers for higher levels of hierarchy. Furthermore, each server may be assigned a standard IP address, and standard routing protocols can be used between the servers. Further still, on each server network, servers may be assigned to perform routings based on historical data, such as servers having a historically fastest responding time. Alternatively, a risk measure may route requests or content to a server, within a particular server network, that maximizes the probability of a response. Alternatively still, servers within a particular network may be assigned operations according to a desired level of fault tolerance specified by a particular user by a service level agreement.

Figure 2:
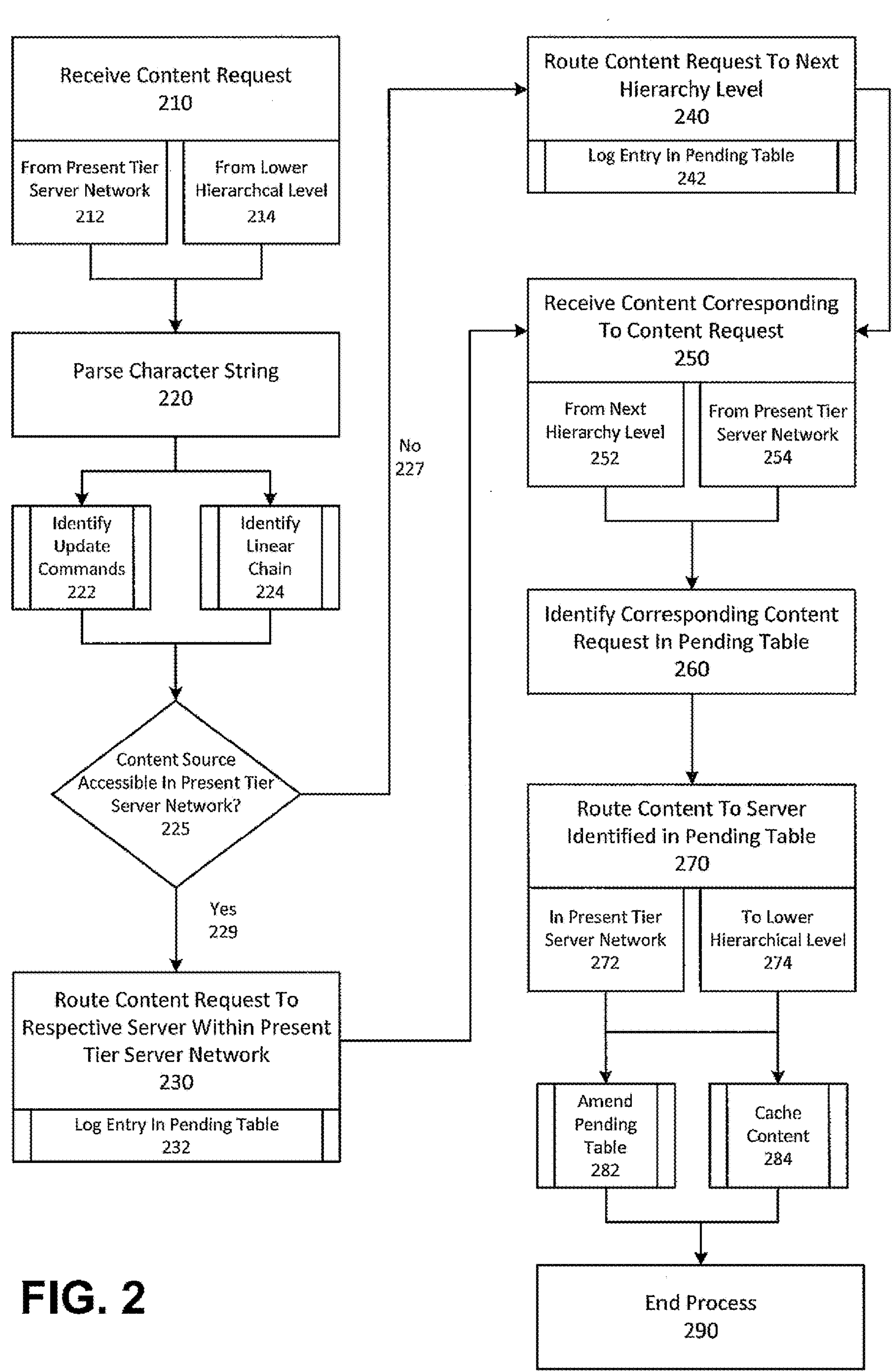
FIG. 2 illustrates an example method of routing a content request using a linearly published character string.

FIG. 2 illustrates an example method of routing a content request using a linearly published character string, according to example described herein. In the below description of FIG. 2, reference may be made to like reference characters representing various features of FIG. 1A for illustrative purposes. Referring to FIG. 2, the present tier server 100 can receive a content request 104 (210). The content request 104 can be received from a present tier server network 117 (212) or a lower hierarchy level 108 (214). The content request 104 may correspond to content 106 associated with a published character string 112, which may have been published linearly through the region-based hierarchical network.

The present tier server 100 may then parse the character string 112 included with or comprising the content request 104 (220). In doing so, the present tier server 100 may identify whether the character string 112 includes commands to update data or content (222), and may further identify linear chain data 132 (224) in order to determine whether a linear chain, corresponding to the character string 112, intersects the present tier server network 117. Thus, the present tier server 100 can determine whether a content source storing the requested content is directly linked to the present tier server network 117 (225).

According to one or more examples, if the content source is directly linked to the present tier server network 117 (229), the present tier server 100 can route the content request to a respective server in the present tier server network (230) and log an entry indicating the content request in a pending interest table 156 (232). However, if the content source is not directly linked to the present tier server network 117 (227), the present tier server 100 can automatically route the content request 104 up to a next hierarchical level 168 (240). Upon doing so, the present tier server 100 can log an entry in the pending interest table 156 indicating the content request 104, and optionally the server(s) from which the content request was received, and the server to which the content request 104 was sent (242).

The content 106 corresponding to the content request 104 is later received by the present tier server 100 (250). The content 106 is either received from the next hierarchy level 168 if the content request was submitted to the next hierarchy level 168 (252), or from the present hierarchy level 118 if the content request 104 was submitted to another present tier server in the present tier server network 117 (254).

In accordance with one or more examples, based on the content 106, or character string 112 included with the content 106, the present tier server 100 can identify the corresponding content request 104 in the pending interest table 156 (260). Based on the logged entry corresponding to the content request 104, the present tier server 100 can determine the server from which the content request was received, and submit the content to that specific server (270)—which, in turn, performs a similar process in order to ultimately transmit the content 106 to the requestor 102. If the content request 104 was received from another server in the present tier server network 117, the present tier server 100 will send the content 106 to that specified server with the present tier server network (272). However, if the content request 104 was received from the lower hierarchical level 108, then the present tier server 100 will submit the content 106 to the specified lower tier server 105 from which the content request 104 was received (274).

According to some examples, once the content 106 is submitted, the present tier server 100 may amend or delete the logged entry corresponding to the content request 104 in the pending interest table 156 (282). Additionally or alternatively, the present tier server 100 may cache the content 106 temporarily in case a content request is received for the same content 106—in which case the content request may be halted and the content 106 pulled from the content cache 158 of the present tier server 100. Once the content 106 is submitted, the pending interest table 156 amended, and the content 106 cached in the content cache 158, the process ends (190).

Figure 3:
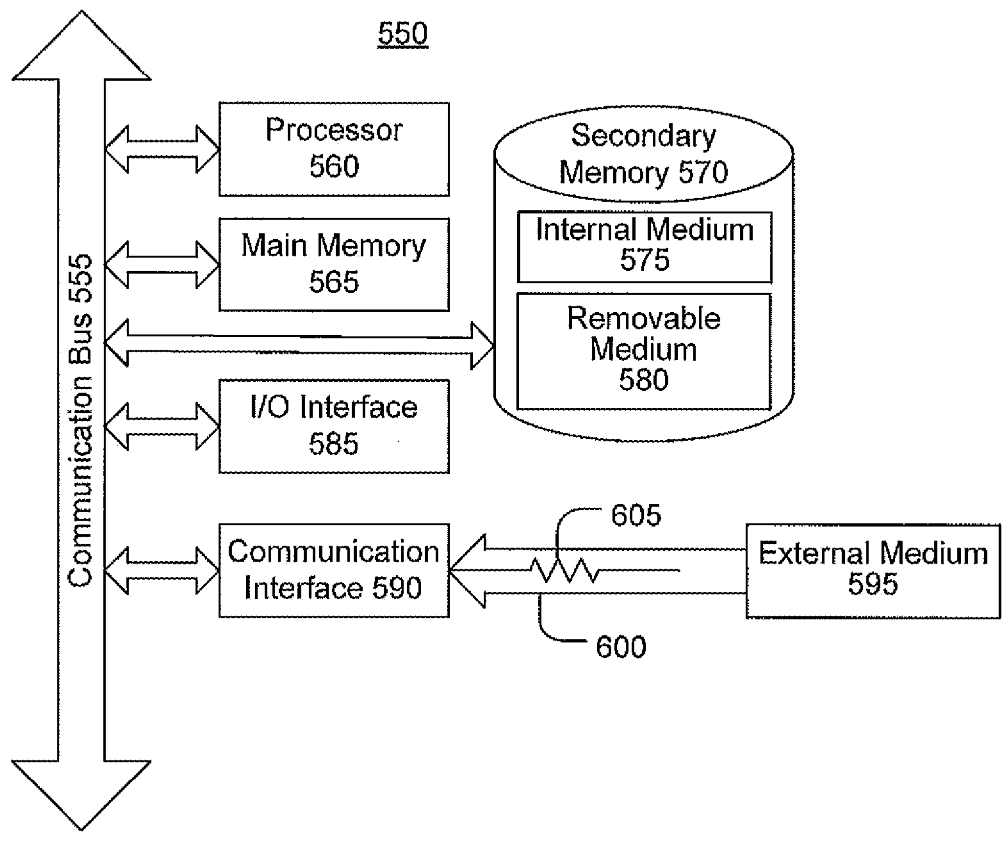
FIG. 3 is a block diagram illustrating an example computing system in which examples described herein may be implemented.

FIG. 3 is a block diagram illustrating an example computing system in which examples described herein may be implemented. For example, a server 550 may be used in connection with various examples disclosed herein. The server 550 may be used as or in conjunction with one or more of the processes described above, and may represent examples of servers included in the description with respect to FIGS. 1A and 1B. The server 550 can be a server or any other processor enabled device that is capable of data communication. Other computing systems and/or architectures may also be used, as will be clear to those skilled in the art. The server 550 may include one or more processors, such as processor 560. Additional processors may be provided, such as an auxiliary processor to manage input/output, an auxiliary processor to perform floating point mathematical operations, a special-purpose microprocessor having an architecture suitable for fact execution of signal processing algorithms (e.g., a digital signal processor), a slave processor subordinate to the main processing system (e.g., a back-end processor), an additional microprocessor or controller for dual or multiple processor systems, or a coprocessor. Such auxiliary processors may be discrete processors or may be integrated with the processor 560.

The processor 560 may be connected to a communication bus 555. The communication bus 555 may include a data channel for facilitating information transfer between storage and other peripheral components of the server 550. The communication bus 555 may further provide a set of signals used for communication with the processor 560, including a data bus, address bus, and control bus (now shown). The communication bus may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE), including IEEE 488 general purpose interface bus (GPIB), IEEE 696/S-100, and the like.

Server 550 may include a main memory 565 and may also include a secondary memory 570. The main memory provides storage of instructions and data for programs executing on the processor 560, such as one or more of the functions discussed above. It should be understood that programs stored in the memory and executed by the processor 560 may be written and/or compiled according to any suitable language, including, without limitation, C/C++, Java, JavaScript, Pearl, Visual Basic, .NET, and the like. The main memory 565 is typically a semiconductor-based memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or removable medium 580, for example a floppy disk drive, a magnetic tape drive, a compact disc (CD) drive, a digital versatile disc (DVD) drive, or other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the server 550 for execution by the processor 560.

In variations, secondary memory 570 may include other similar means for allowing computer programs or other data or instructions to be loaded into the server 550. Such means may include, for example, an external storage medium 595 and an interface 590. Examples of external storage media 595 may include an external hard disk drive or an external optical drive, or an external magneto-optical drive.

Server 550 may include a communication interface 590. The communication interface 590 allows software and data to be transferred between server 550 and external devices (e.g., printers) and networks. For example, computer software or executable code may be transferred to server 550 from a network server via communication interface 590. In addition, the server 550 may receive requests from a client or another server. Examples of communication interfaces 590 include a built-in network adapter, network interface card (NIC), Personal Computer Memory Card International Association (PCMCIA) network card, card bus network adapter or any other device capable of interfacing the server 550 with a network or another computing device.

Software and data transferred via communication interface 590 are generally in the form of electrical communication signals 605/The signals may be provided to communication interface 590 via communication channel 600. In examples, the communication channel 600 may be a wired network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the server 550 to perform the various functions described in connection with the various examples discussed herein.

The term "computer-readable medium" is used to refer to any non-transitory computer readable storage media used to provide computer executable code (e.g., software and computer programs) to the server 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are mean for providing executable code, programming instructions, and software to the server 550.

In examples implemented using software, the software may be stored on a computer readable medium and loaded into the server 550 by way of removable medium 580, I/O interface 585, or communication interface 590. In such examples, the software is loaded into the server 550 in the form of electrical communication signals 605. The software, when executed by the processor 560, causes the processor to perform the functions and process steps described herein.

In various examples, I/O interface 585 provides an interface between one or more components of the server 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tube (CRT) monitors, plasma displays, light-emitting diode (LED) displays, liquid crystal displays (LCDs), printers, vacuum fluorescent displays (VFDs), surface-conduction electron emitter displays (SEDs) field emission displays (FEDs), and the like.

Although illustrative examples have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an example, can be combined with other individually described features, or parts of other examples. Thus, absence of describing combinations should not preclude the inventor(s) from claiming rights to such combinations.

What is claimed is:

1. A regional server for routing content requests, the regional server included in a present server network of a plurality of server networks of a present hierarchical level, the present hierarchical level being one of a plurality of hierarchical levels of a region-based hierarchical network, the regional server comprising:

one or more processors; and one or more memory resources storing instructions that, when executed by the one or more processors, cause the regional server to:

receive a plurality of content requests for a target content from a plurality of end users;

determine whether a linear chain corresponding to the target content intersects with the present server network, the present server network representing a specified geographic region;

based on determining that the linear chain corresponding to the targeted content does not intersect with the present server network, pool the plurality of content requests into a single content request for the targeted content; and forward the single content request to a next hierarchical level of the region-based hierarchical network, the next hierarchical level comprising a number of higher-tiered servers and representing a larger geographic region encompassing the specified geographic region.

2. The regional server of claim 1, wherein the instructions further cause the regional server to parse a character string included in each of the plurality of content requests to determine linear chain data corresponding to the target content.

3. The regional server of claim 2, wherein determining whether the linear chain intersects with the present server network comprises comparing the linear chain data to entries of a linear publication table maintained by the regional server.

4. The regional server of claim 1, wherein the instructions further cause the regional server to maintain a pending interest table that logs the plurality of content requests until the target content is received.

5. The regional server of claim 4, wherein pooling the plurality of content requests comprises appending entries corresponding to the plurality of content requests to a single entry in the pending interest table associated with the target content.

6. The regional server of claim 1, wherein the instructions further cause the regional server to determine whether the target content is stored in a local content cache prior to forwarding the single content request.

7. The regional server of claim 6, wherein the instructions further cause the regional server to provide the target content to the plurality of end users from the local content cache when the target content is stored therein without forwarding the single content request.

8. The regional server of claim 1, wherein the instructions further cause the regional server to transmit the received target content along reverse paths corresponding to the plurality of content requests to respective ones of the plurality of end users.

9. The regional server of claim 1, wherein the instructions further cause the regional server to utilize a forwarding table that maps name prefixes of the target content to one or more network interfaces for forwarding the single content request.

10. The regional server of claim 1, wherein the instructions further cause the regional server to isolate a plurality of redundant or malicious requests at a lowest hierarchical level by pooling the plurality of content requests into the single content request.

11. The regional server of claim 1, wherein the instructions further cause the regional server to receive the plurality of content requests via a lower-tier interface coupled to a lower hierarchical level of the region-based hierarchical network.

12. The regional server of claim 11, wherein the instructions further cause the regional server to forward the single content request via a higher-tier interface coupled to the next hierarchical level.

13. The regional server of claim 1, wherein the linear chain corresponds to a linear publication of names associated with the target content through the plurality of hierarchical levels of the region-based hierarchical network.

14. The regional server of claim 1, wherein the instructions further cause the regional server to determine, based on the linear chain, a single intersecting node at each hierarchical level for routing the single content request.

15. The regional server of claim 1, wherein the instructions further cause the regional server to cache the target content for a predetermined time period after receipt from the next hierarchical level.

16. The regional server of claim 15, wherein the predetermined time period is dynamically adjusted based on a frequency of subsequent requests for the target content.

17. The regional server of claim 1, wherein the instructions further cause the regional server to determine whether the target content is accessible within another server of the present server network prior to forwarding the single content request to the next hierarchical level.

18. The regional server of claim 17, wherein the instructions further cause the regional server to route the plurality of content requests horizontally within the present server network when the target content is accessible within the present server network.

19. The regional server of claim 1, wherein the plurality of hierarchical levels form a fractal-like topology in which each higher hierarchical level represents a progressively larger geographic region.

20. The regional server of claim 1, wherein the instructions further cause the regional server to process a content request comprising a command to update data associated with the target content and to receive an acknowledgment corresponding to the update via the region-based hierarchical network.

* * * * *